(No Model.)
J. R. THOMAS & H. J. CORDESMAN, Jr.
SAW ARBOR.
No. 248,963.  Patented Nov. 1, 1881.
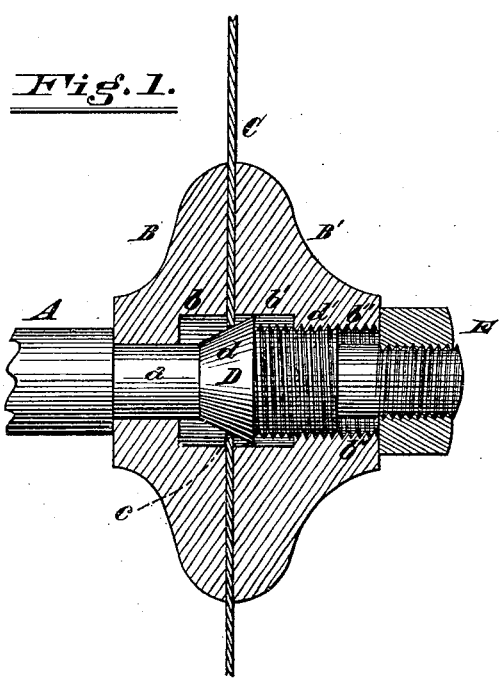
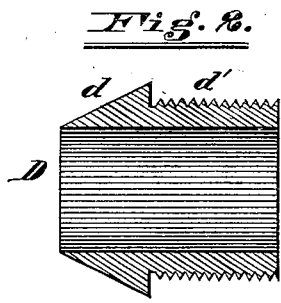
Attest  Inventors
Jns. E. Jones  Henry J. Cordesman jr
Eugene L. Pinkoces  John R. Thomas
  by Wood & Boyd
  Attorneys

UNITED STATES PATENT OFFICE.

JOHN R. THOMAS, OF SPRINGFIELD, AND HENRY J. CORDESMAN, JR., OF CINCINNATI, OHIO.

SAW-ARBOR.

SPECIFICATION forming part of Letters Patent No. 248,963, dated November 1, 1881.

Application filed April 8, 1881. (No model.)

*To all whom it may concern:*

Be it known that we, JOHN R. THOMAS and HENRY J. CORDESMAN, Jr., both citizens of the United States, residents, respectively, of Springfield, Clarke county, State of Ohio, and Cincinnati, in the county of Hamilton and State of Ohio, have invented certain new and useful Improvements in Saw-Arbors, of which the following is a specification.
Our invention relates to an improvement in that class of saw-arbors in which the saw is secured on the arbor between two collars having an annular sliding conical-headed sleeve or bushing to adapt the arbor to saws having various-sized holes; and it consists in making the annular sleeve or bushing screw-threaded from the conical head to the opposite end, and screw-threading the annular bore of the movable collar which is mounted thereon and in which it operates, the whole more fully described hereinafter.

In the accompanying drawings, Figure 1 is a sectional elevation of our improved arbor, showing the saw, which is broken and in section, mounted thereon. Fig. 2 is a longitudinal central section of the conical-headed sleeve.

A $a$ represent the arbor, upon which the saw is mounted.

B B' represent two collars or circular plates mounted on the arbor $a$, between which the saw C is secured. The collar B is preferably a fixed one, having an annular recess, $b$, constructed therein. The collar B' is a movable one, being provided with an annular recess or space, $b'$, a portion of which is shouldered and screw-threaded, as shown at $b''$.

D represents an annular sleeve or bushing, which has a conical head, $d$, on its end $d'$, being screw-threaded and operating within the threaded recess $b''$ of collar B'. The annular spaces $b$ $b'$ are sufficiently large to permit the lateral movement of the conical head $d$ of the sleeve D therein when adjusting it to fit the central orifice, $c$, in the saw. E represents a jam-nut on the end of arbor $a$, abutting against the outer face of collar B' to secure the parts in position.

What we claim is—

1. The combination, with the arbor $a$ and collar B, of the collar B', having a central internally-threaded opening, $b''$, and the sleeve having a conical head, $d$, and an externally-threaded end extension, $d'$, adapted to the threaded opening of the collar B', substantially as described.

2. In a saw-arbor, the combination of the mandrel $a$, the collar B, having interior recess $b$, and the movable collar B', having an interior recess, $b'$, and the internally-threaded opening $b''$, with the sleeve provided with a conical head, $d$, and externally-threaded end $d'$, adapted to the threaded opening through the movable collar, substantially as described.

In testimony whereof we have hereunto set our hands in the presence of two subscribing witnesses.

JOHN R. THOMAS.
HENRY J. CORDESMAN, JR.

Witnesses to the signature of John R. Thomas:
HENRY MILLWARD,
PAUL A. STALEY.

Witnesses to the signature of Henry J. Cordesman, Jr.:
J. H. CHARLES SMITH,
THOS. P. EGAN.